United States Patent [19]
Faust et al.

[11] Patent Number: 5,747,676
[45] Date of Patent: May 5, 1998

[54] METHOD AND DEVICE FOR DETERMINING THE SURFACE CONTOUR IN AN ELASTIC SEAT CUSHION DEFORMABLE FOR UNDER LOAD

[75] Inventors: Eberhard Faust, Stuttgart; Wolfram Judenhahn, Leutenbach; Lothar Kassing, Nufringen; Karl Pfahler, Stuttgart; Reiner Renz, Ostelsheim, all of Germany

[73] Assignee: Mercedes-Benz AG, Stuttgart, Germany

[21] Appl. No.: 786,447

[22] Filed: Jan. 21, 1997

[30] Foreign Application Priority Data

Jan. 20, 1996 [DE] Germany ............... 196 01 972.9

[51] Int. Cl.⁶ .................................................. G01B 5/28
[52] U.S. Cl. ................ 73/105; 73/862.621; 73/862.632
[58] Field of Search .................. 73/104, 105, 862.621, 73/862.636, 862.637; 297/452.21, 452.48, 452.56

[56] References Cited

U.S. PATENT DOCUMENTS 3,614,237  10/1971  Kyle ........................... 73/105
5,163,333  11/1992  Brubaker et al. ........... 73/865.8
5,248,185  9/1993   Weingartner et al. ...... 297/452.58
5,595,806  1/1997   Korfmacher ................ 423/69

FOREIGN PATENT DOCUMENTS 37 34 023   4/1989   Germany.
39 17 992   12/1990  Germany.
40 01 100   7/1991   Germany.

Primary Examiner—George M. Dombroske
Assistant Examiner—Max H. Noori
Attorney, Agent, or Firm—Evenson, McKeown, Edwards & Lenahan, P.L.L.C.

[57] ABSTRACT

A method and a device for determining the surface contour of an elastic seat cushion deformable under load are provided. Through the use of a measuring mat placed on the seat cushion, after the load is relieved, the resultant deformed state corresponding to the deformed surface of the cushion is preserved by applying a vacuum to the measuring mat. The three-dimensional surface contour of the measuring mat fixed in its deformed state is measured with a multicoordinate measuring device in known fashion. The measuring mat consists of two vacuum-tight material webs, especially plastic films, connected vacuum-tight with one another to form a pocket having a vacuum connection, with the pocket being filled with a granulate, preferably a foam granulate.

15 Claims, 1 Drawing Sheet

METHOD AND DEVICE FOR DETERMINING THE SURFACE CONTOUR IN AN ELASTIC SEAT CUSHION DEFORMABLE FOR UNDER LOAD

BACKGROUND AND SUMMARY OF THE INVENTION

The invention relates to a method for determining the surface contour of an elastic seat cushion, said contour being deformed by the load imposed by a person seated on any seat, and a device for practicing the method.

In the development of seats for motor vehicles in order to meet higher comfort demands on the seat cushion, it is necessary to be able to reproducibly determine the shape of the seat cushion in the finished seat, as deformed under the load of the person seated on the seat. Previously, this was possible only in a complex manner in specially prepared seats having measuring devices integrated into the seat cushion. The shape determination previously could only be performed for a relatively small number of measurement points. Contour determination under load in any seat, for example seats manufactured and ready for installation, to be installed in a motor vehicle, for manufacturing maintenance, in seats from outside suppliers for comparison measurements, or for seats in use for a long time, is not possible with the known measuring equipment.

A measuring mat for detecting pressure distribution, especially for measurements on curved surfaces, is known from German Patent document DE 37 34 023 C2. This mat performs a force measurement that measures changes in capacitance or inductance using the measuring mat. With such a measuring mat, however, only the pressure distribution in the loaded seat area, but not the surface contour, can be determined.

German Patent document DE 40 01 100 A1 shows a test seat for determining the body contour of persons when sitting. In this case, it is not the seat or its upholstery that is the subject of the determinations, but rather the individual or those parts of his body that are stressed when sitting. The purpose is to determine the body contour when sitting, from the buttocks through the lordosis area and up to the neck area. Detection of lateral body contour during sitting is also intended. The seat itself is the measuring means in this case. The known test seat is composed of a plurality of individual cushions held to fit the body by a dimensionally stable frame. The cushions, in turn, are aligned with one another to form a cohesive bond. Each individual cushion is sealed airtight, filled with granulate, and provided with an air connection to fill or empty it. To determine the body contour of a person, the latter sits on the test seat. Under the load of the person, the individual cushions assume the contours of the body. By evacuating the cushion, this cushion shape is stabilized before the person gets up from the test seat and is immobilized to measure the contours. This type of contour detection of seated persons in the area of the buttocks and back offers no suggestion whatsoever regarding the opposite problem, namely determining the contours of loaded cushions of actual seats.

The goal of the invention is firstly to provide a method that makes it possible in a technically simple fashion to reproducibly determine the surface contour of an elastic cushion of any actual seat that is loaded and deformed by a person seated thereon. It is also the goal of the invention to provide a device for putting the method into practice.

This goal is achieved according to the invention by a method for determining the surface contour of an elastic seat cushion. The cushion is deformed under the load of a person seated on any seat. A measuring mat is placed in the correct position on the surface of the cushion to be measured while it is still in the unloaded state. The measuring mat is flexible while it is in the pneumatically unloaded state and possesses a low natural rigidity in this state. The mat can be made rigid in any desired deformed state by applying a vacuum so that the deformed state of the measuring mat can be preserved as a result. After the measuring mat is placed on the cushion to be measured, the cushion has a load applied to it by a test subject sitting on it or by a seat punch simulating this process. The measuring mat is deformed along with the cushion. Then the measuring mat is made rigid by applying a vacuum and the deformed state of the measuring mat that is obtained and which corresponds to the deformed surface of the cushion is preserved before the load is released from the seat cushion. After the subject gets up from the cushion or the seat punch is removed, the three-dimensionally deformed shape-fixed measuring mat is removed from the cushion and its surface contour is measured in known fashion by a multicoordinate measuring device.

A device for achieving the goal includes a measuring mat for determining the surface contour of an elastic seat cushion in order to practice the method, said contour being deformed under the load of the person seated on any seat. The measuring mat is formed by two material webs, made especially of plastic film, connected with one another in a vacuum-tight fashion at the outer edges, especially by welding (such as by using a welded seam) and provided with a closable suction connection in a vacuum-tight fashion. The space enclosed between the material webs is filled completely and uniformly with a granulate. The thin and flexible measuring mat can easily be applied to any seat. Under load, it follows every deformation of the cushion but can be stabilized in any shape by a vacuum and immobilized for measurement purposes. The measuring mat for putting the method into practice consists of two thin-walled webs, plastic films for example, connected vacuum-tight with one another at their outer edges, by welding for example, and provided with a closable suction connection, and the space formed between the webs is then filled completely and uniformly with a granulate.

Other objects, advantages and novel features of the present invention will become apparent from the following detailed description of the invention when considered in conjunction with the accompanying drawings.

DETAILED DESCRIPTION OF THE DRAWINGS

Figure 1:
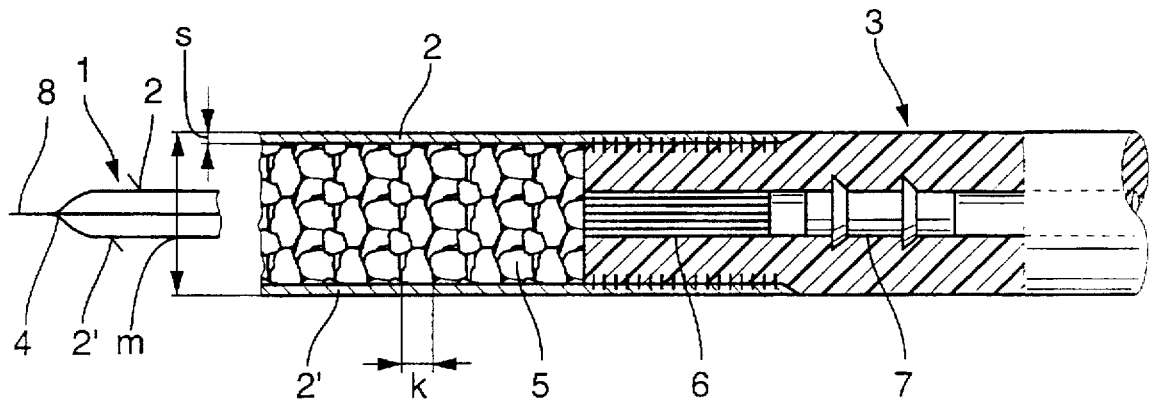
FIG. 1 is a view of a measuring mat according to the invention (at left) and a sectional view through the measuring mat (at right, considerably enlarged) in the flat state before the test is performed.

The measuring mat 1 shown in the figures is very flexible and has low intrinsic rigidity. The outside walls 2, 2' of the measuring mat are made of a plastic film with a wall thickness, dimension s, of 0.1 to 1.00 mm, said plastic being polyethylene, polypropylene, or polyvinylchloride for example. Two plastic films are placed on top of one another in the form of a U to form a pocket and are welded together vacuum-tight at their outer edges by a welded seam 4. A granulate 5 is loaded into the space enclosed between the material webs in a manner that is uniform but forms a layer of limited thickness; the granulate will be discussed in further detail below. At three circumferential sides, triangular tips 8 are provided for position-defined alignment of measuring mat 1 on the surface of the seat cushion. On one circumferential side, at the edge of the measuring mat, a vacuum connection 3 is provided that is formed by a small vacuum hose welded at the measuring mat edge between the films. A filter 6 for retaining granulate 5 is integrated in the vacuum connection, as is a check valve 7 that seals vacuum-tight and automatically blocks the flow in the direction of the measuring mat. The granulate loaded into the interior of measuring mat 1 in one version consists of a pourable plastic soft foam, preferably a polystyrene soft foam. The granulate particles can consist of chips or raspings obtained by grinding polystyrene foam blocks. In addition, pourable clay grains or a corresponding aluminum granulate have proven to be suitable as a filler for the measuring mat. Granulate 5 has a grain size, dimension k, of 0.5 to 5.0 mm, especially 1.0 to 1.5 mm. The measuring mat itself, in the filled non-evacuated state, has a mat thickness, dimension m, of 2 to 8 mm but a mat thickness of less than 5 mm is preferred.

To perform a contour measurement of the surface of a seat cushion, a measuring mat of the type described above is initially applied in a certain position on the surface to be measured in the still unloaded state, and then a test person, applying a load to the seat, deforms the seat cushion and, following the contours, the measuring mat as well. Then the three-dimensional deformation state of the measuring mat that is obtained and corresponds to the deformed surface of the seat cushion is preserved by applying a vacuum to the interior of the measuring mat, whereupon the measuring mat is given a high intrinsic rigidity that corresponds to the individual state of deformation. The measuring mat, with the seat contour accurately preserved, can be removed like a seat shell from the seat; see FIG. 2. The measuring mat, preserved in the deformed state of the surface of the seat cushion, is sufficiently intrinsically elastic so that when the test person stands up, the temporary deformation that then occurs, admittedly undesirable but unavoidable, is not preserved; instead, the original shape corresponding to the measured state is automatically restored because of the intrinsic elasticity. Then the measuring mat, with its shape preserved, is removed and measured to determine its deformed state using a multicoordinate measuring device in known fashion.

Figure 2:
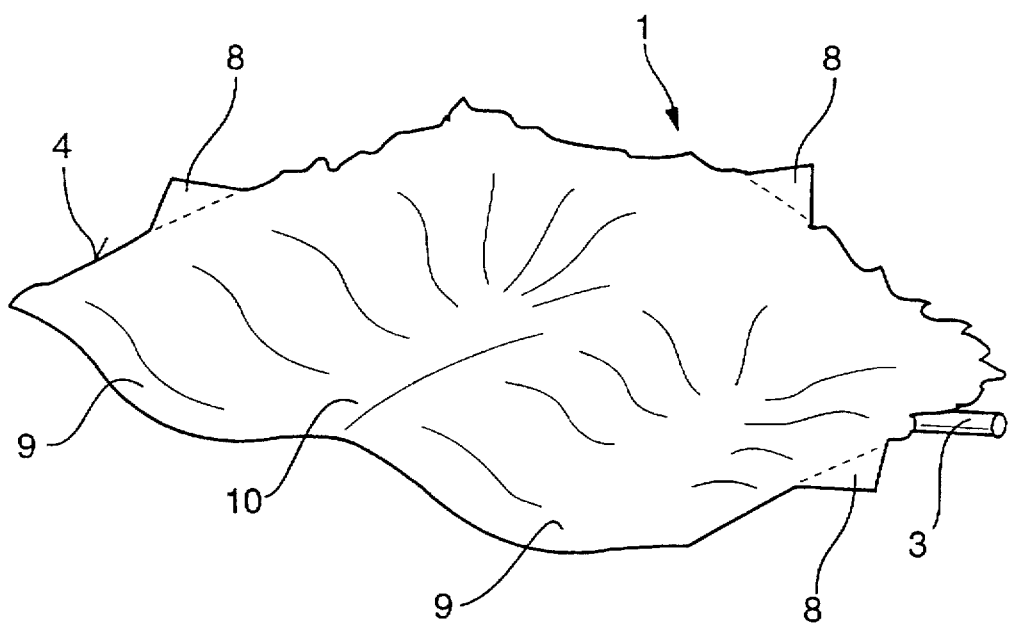
FIG. 2 is a perspective view of the loaded, deformed measuring mat according to FIG. 1, stabilized by evacuation into the deformed state.

In the deformed state of the measuring mat shown in FIG. 2, the two indentations 9 made by the upper legs and the shape of the center of the buttocks 10 can be seen.

In manufacturing a certain embodiment of a measuring mat, a polyethylene film with a thickness of 0.13 mm was folded in a U-shape to form a pocket and this was then welded at the edges; the thickness of the pocket made of plastic film without the filler was 0.52 mm; the length was 54 cm and the width 43 cm. The pocket was filled with polystyrene soft foam chips with a diameter of 1 to 3 mm, obtained by grinding polystyrene soft foam blocks. The thickness of the filled pocket was 5 mm. The diameter of suction connection 3 at the filling point for the pocket was 4 mm.

The measuring mat produced in this fashion was placed on the seat cushion of a vehicle seat to determine the contour, and a test subject weighing 75 kg sat on the seat. Before the subject had gotten up again, a vacuum was applied to the measuring mat by a water-jet pump for a period of 10 to 20 seconds, and the state of the deformed measuring mat was preserved. The measuring mat thickness in this state was about 1 to 2 mm; the contour of the surface of the seat cushion was reproduced perfectly and with sharp boundaries preserved in the measuring mat. For correct determination of the resultant contour of the measuring mat, it is important that the vacuum pump be switched off before the subject relieves the seat cushion of his weight, in other words that the vacuum is not increased any further. If the vacuum is increased after the individual gets up, the shape of the measuring mat may change as it is freed. It has been found to be optimum to measure the measuring mat within 60 minutes, after the load is removed from the measuring mat or after the vacuum is shut off. The shape accuracy was retained very well for up to 35 minutes in measuring mats that had been evacuated and relieved of their loads; only slight increases in the corner radii can be seen within this period of time. After 60 minutes, the vacuum in the measuring mat falls to a slight extent and shape changes occur.

The advantages that can be achieved with the invention consist in the fact that the method for determining the surface contour of an elastic seat cushion can be performed without any special measures on any motor vehicle seat and with any test person. By means of the measuring mat and the measuring method it makes possible, a great time savings is achieved in developing motor vehicle seats. Conventional multicoordinate measuring devices may be used for measuring the deformed and stabilized measuring mat, so that a great deal of data is obtained in a simple fashion regarding the deformed state of the seat cushion caused by the load. Of course, the method according to the invention can be used to detect the surface contour of seat cushions in developing seats for motor vehicles of all kinds, for example automobiles, trucks, or buses and for railroad cars, aircraft, and also for upholstered furniture in the home.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A method for determining a surface contour of an elastic seat cushion, said contour being deformed under a load applied by a person seated on the seat cushion, the method comprising the steps of:

placing a measuring mat on a surface of the seat cushion to be measured while in an unloaded state, said measuring mat being flexible in a pneumatically unloaded state while possessing a low natural rigidity in said pneumatically unloaded state, and being made rigid in any desired deformed state by applying a vacuum such that said desired deformed state of the measuring mat is preserved;

after said placing step, applying a load to the seat cushion via one of a test subject sitting on said measuring mat and seat cushion and a seat punch simulating a sitting process;

as a result of said applied load, deforming the measuring mat along with said seat cushion;

applying a vacuum to the measuring mat so as to make the measuring mat rigid such that the deformed state of the measuring mat obtained corresponding to a deformed surface of the seat cushion is preserved before the load is released from the mat and seat cushion;

after the test subject or the seat punch is removed from the measuring mat and seat cushion, removing the measuring mat from the seat cushion, said mat now being in a three-dimensionally deformed shape-fixed condition; and measuring the surface contour of said three-dimensionally deformed shape-fixed condition of the measuring mat via a multicoordinate measuring device.

2. An apparatus for determining a surface contour of an elastic seat cushion, said elastic seat cushion being deformed under a load in use, said apparatus comprising:

a measuring mat formed of two facing material webs bounding a space filled with granulate material, said webs being connected by a seam enclosing said space, and a vacuum connection opening to said space for selectively evacuating said space, said mat being flexible and having low intrinsic rigidity so as to conform to a curved surface when deformed under a load and unevacuated and being rigid when said space is evacuated, thereby forming a three-dimensionally deformed shape-fixed measuring mat for accommodating a multicoordinate measuring device.

3. The device according to claim 2, wherein said two material webs are made of a plastic film and are connected with one another via a welded seam.

4. The device according to claim 2, wherein said granulate inside the measuring mat is a pourable plastic soft foam.

5. The device according to claim 2, wherein the granulate inside the measuring mat is a polystyrene soft foam.

6. The device according to claim 2, wherein the granulate inside the measuring mat is one of clay grains and aluminum granulate.

7. The device according to claim 2, wherein the granulate inside the measuring mat is composed of irregularly shaped grains such as one of raspings and chips.

8. The device according to claim 2, wherein the granulate inside the measuring mat has a grain size of 0.5 to 5.0 mm.

9. The device according to claim 2, wherein the granulate inside the measuring mat has a grain size of 1.0 to 2.0 mm.

10. The device according to claim 2, wherein said measuring mat has a mat thickness of 3 to 8 mm when filled with the granulate in a non-evacuated state.

11. The measuring mat according to claim 2, wherein the measuring mat has a mat thickness of approximately 5 mm when filled with the granulate in a non-evacuated state.

12. The device according to claim 2, wherein said two material webs externally delimiting the contour of the measuring mat have a wall thickness of 0.1 to 0.15 mm.

13. The measuring mat according to claim 2, wherein said two material webs externally delimiting the contours of the measuring mat are formed of a plastic film from the group consisting of: polyethylene, polypropylene, or polyvinylchloride.

14. The measuring mat according to claim 2, further comprising:

a filter for retaining the granulate;

a check valve which automatically seals the measuring mat in a vacuum-tight manner to block flow in a direction of the measuring mat, said filter and said check valve being integrated in said suction connection of the measuring mat; and wherein said suction connection is formed via a small vacuum hose welded at the outer edge of the measuring mat.

15. The device according to claim 2, wherein at least one definitely shaped tip is molded centrally on at least three lateral edges of the measuring mat, for position-defined alignment of the measuring mat on the surface of the seat cushion.

* * * * *